United States Patent [19]
Okano et al.

[11] Patent Number: 5,838,952
[45] Date of Patent: Nov. 17, 1998

[54] EMULATOR APPARATUS TO BREAK RUNNING PROGRAM WHEN VARIABLE IS READ WITHOUT BEING INITIALIZED

[75] Inventors: Masahiro Okano, Hyogo; Eisuke Shimomura, Tokyo, both of Japan

[73] Assignees: Mitsubishi Electric Semiconductor Software Co., LTD., Hyogo; Mitsubishi Denki Kabushiki Kaisha, Tokyo, both of Japan

[21] Appl. No.: 747,049

[22] Filed: Nov. 12, 1996

[30] Foreign Application Priority Data

May 28, 1996 [JP] Japan .................................. 8-133765

[51] Int. Cl.⁶ ............................ G06F 9/455; G06F 11/00
[52] U.S. Cl. ............................................................ 395/500
[58] Field of Search .................................. 395/500, 385, 395/183.04, 183.05

[56] References Cited

U.S. PATENT DOCUMENTS

| | | | |
|---|---|---|---|
| 4,847,807 | 7/1989 | Ishii et al. ................................ | 395/500 |
| 5,321,828 | 6/1994 | Phillips et al. ........................... | 395/500 |
| 5,557,762 | 9/1996 | Okuaki et al. ........................ | 395/183.1 |
| 5,664,199 | 9/1997 | Kuwahara ................................ | 395/734 |
| 5,715,435 | 2/1998 | Ikei ........................................ | 395/500 |

FOREIGN PATENT DOCUMENTS

| | | |
|---|---|---|
| 63-208953 | 8/1988 | Japan . |
| 581087 | 4/1993 | Japan . |
| 5224985 | 9/1993 | Japan . |

*Primary Examiner*—Kevin J. Teska
*Assistant Examiner*—Ayni Mohamed
*Attorney, Agent, or Firm*—Leydig, Voit & Mayer

[57] ABSTRACT

An emulator apparatus includes an access information memory in which, when an emulation program makes a write access to a memory address of a microcomputer, and information showing the presence of the write access is related to the write-accessed address and is stored. A break circuit to break execution of the emulation program when the emulation program makes a read access to the memory address of the microcomputer is provided, and the access information memory does not contain information showing the presence of the write access to the read-accessed address.

13 Claims, 5 Drawing Sheets

EMULATOR APPARATUS TO BREAK RUNNING PROGRAM WHEN VARIABLE IS READ WITHOUT BEING INITIALIZED

BACKGROUND OF THE INVENTION

1. Field of the Invention

The present invention relates to an emulator apparatus to support development of a program for a microcomputer.

2. Description of the Related Art

In development of a program for a microcomputer, an emulator apparatus is used as a development supporting system to find and correct bugs in the program in the course of development.

FIG. 4 is a diagram showing an arrangement for a program development system using a conventional emulator apparatus. In the drawing, reference numeral 10 is a host computer, 11 is the emulator apparatus, 12 is a target system equipped with a microcomputer serving as a target of the development, 13 is a communication cable for transmitting and receiving data between the host computer 10 and the emulator apparatus 11, and 14 is a probe to electrically connect the emulator apparatus 11 to the target system 12. Further, a distal end of the probe is provided with a microcomputer 14a operated in the target system 12, and is inserted into a socket of the target system 12.

Debugging software is activated on the host computer 10, and the software is operated to control the emulator apparatus 11. The host computer 10 is also used to create a program for control of the emulator apparatus 11.

In order to develop a program for a microprocessor, the program is written by using a programming language. A word processor running on the host computer 10 is used to write the program. Further, a translating software tool such as compiler or assembler is used to obtain machine readable information which the microprocessor can directly execute from a data file created by the word processor. The translating software tool reads the data file created by the word processor, and creates and outputs machine language data corresponding to the program.

The emulator apparatus 11 is used for a debug operation to find, for example, a bug in the program created in the development of the program for the microcomputer. The emulator apparatus 11 has two main functions, including the function of executing the program, and the function of breaking the program.

First, a description will be given of the function of executing the program. For example, in the target system such as copying machine or air conditioner, a microcomputer is operated by finally writing the program onto a read-only memory (hereinafter referred to as ROM). However, in the emulator apparatus, it is possible to execute the created program without writing the program onto the ROM.

Next, a description will be given of the function of breaking the program. When the target system is not operating correctly as a result of executing the program in the above manner, it is necessary to find and correct the bug in the program. In the debug operation, the break function is used to suspend program execution. It is possible to find the bug in the program by gradually executing the program by the break function, and confirming the operation of the target system, an effective address in the program, and so forth. In the break function, it is possible to specify a break condition to cause a break when a bus access such as a read, a write, or an instruction fetch is made at a specific address.

FIG. 5 is a block diagram showing a structure of the conventional emulator apparatus. In the drawing, reference numeral 20 is a monitor circuit to interpret a command sent from the host computer 10, and execute processing according to the command, 21 is a communication interface between the host computer 10 and the monitor circuit 20, 22 is an emulation memory in which program information for emulation transferred from the host computer 10 is stored, 23 is a break circuit to make a decision to break the program when the access meeting the break condition is made, and post it to the monitor circuit 20, and 24 is a bus control circuit to control access of system buses 25.

The break circuit 23 includes an address comparing circuit 30 in which address information among the break condition signal sent from the monitor circuit 20 is stored an address outputted onto the system bus 25 is detected every time to compare whether or not the address matches the break condition, a read/write signal comparing circuit 31 to decide whether access of the emulation program is a read access or a write access by detecting a read/write signal on the system bus 25, and a break decision circuit 32 to transfer a break signal to the monitor circuit 20 depending upon the results of comparison in the address comparing circuit 30 and the read/write signal comparing circuit 31.

First, the break condition is sent to the break circuit 23 from the monitor circuit 20. That is, a desired address and a desired access type are transferred. There are two access types including the read access and the write access. Further, when there is made access of the access type set at an address at which the break condition is set, the break circuit 23 sends to the monitor circuit 20 the break signal to break the operation of the emulation program in the microcomputer.

In the conventional emulator apparatus as described above, even when a global variable is read without being initialized, the operation is regarded as a normal operation, resulting in incapability of break. However, if the global variable is read without being initialized, the program may be operated depending upon not an originally intended value but an indefinite value, and unexpected troubles may be caused.

SUMMARY OF THE INVENTION

Since the conventional emulator apparatus has the above structure, there is a problem in that, even when a global variable is read without being initialized, the operation is regarded as a normal operation, resulting in incapability of break.

In order to overcome the above problem, it is an object of the present invention to provide an emulator apparatus which can break when the global variable is read without being initialized.

According to the present invention, for achieving the above-mentioned objects, there is provided an emulator apparatus including read/write access deciding means connected to system buses of a microcomputer, for deciding whether a running emulation program makes a read access or a write access, access information storing means in which, when it is decided as a result of decision by the read/write access deciding means that the running emulation program makes the write access to a memory address of the microcomputer, information showing the presence of the write access is related to the write-accessed address and is stored, and break means for breaking execution of the emulation program when it is decided as a result of decision by the read/write access deciding means that the running emulation program makes the read access to the memory address of the microcomputer, and the access information storing means does not contain information showing the presence of a write access to the read-accessed address. As a result, it can be recognized in the emulator apparatus that the program refers to the variable without being initialized.

Further, according to the present invention, there is provided an emulator apparatus having address deciding means for deciding whether or not a read access or a write access is made by a running emulation program to an address in an address range of a global variable specified by the emulation program. When the address deciding means decides that the write access is made to the address in the address range of the global variable, information showing the presence of the write access is related to the write-accessed address and is stored in the access information storing means. As a result, it can be recognized in the emulator apparatus that the program refers to the global variable without being initialized.

Further, according to the present invention, there is provided an emulator apparatus in which access information storing means includes an access information memory having an address corresponding to a memory address of a microcomputer in a one-to-one manner. When a running emulation program makes a write access to the memory address of the microcomputer, information showing the presence of the write access to the address of the access information memory corresponding to the write-accessed address is stored in the access information storing means. As a result, without the need for a structure in which, for example, the memory address of the microcomputer is converted, it can be recognized in the emulator apparatus that the program refers to the variable without being initialized.

Further, according to the present invention, there is an emulator apparatus in which information showing the presence of a write access is stored in access information storing means for each address area occupied by each global variable specified by an emulation program. As a result, there is an effect in that a memory capacity of the access information storing means can be reduced.

Further, according to the present invention, there is provided an emulator apparatus having data deciding means connected to system buses of a microcomputer, for deciding whether or not a value of data outputted from the microcomputer to the system bus during execution of an emulation program is zero. When it is decided as a result of decision of read/write access deciding means that the running emulation program makes a write access to a memory address of the microcomputer, and it is decided as a result of decision of data deciding means that a value of data written by the write access is zero, information about the number of times data having a value of zero is written to the write-accessed address is related to the write-accessed address and is stored in the access information storing means. Further, break means breaks the emulation program when it is decided as a result of decision of the read/write access deciding means that the running emulation program makes a read access to a memory address of the microcomputer, and information stored in the access information storing means shows that data having a value of zero is stored at the read-accessed address only once. As a result, even when a data area is reset to zero by an initialization file of a user program, and a value of a global variable is thereafter set in the program, it is possible to break the program when the global variable is read without setting.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Preferred embodiments of the invention will now be described in detail referring to the accompanying drawings.

Embodiment 1

Figure 1:
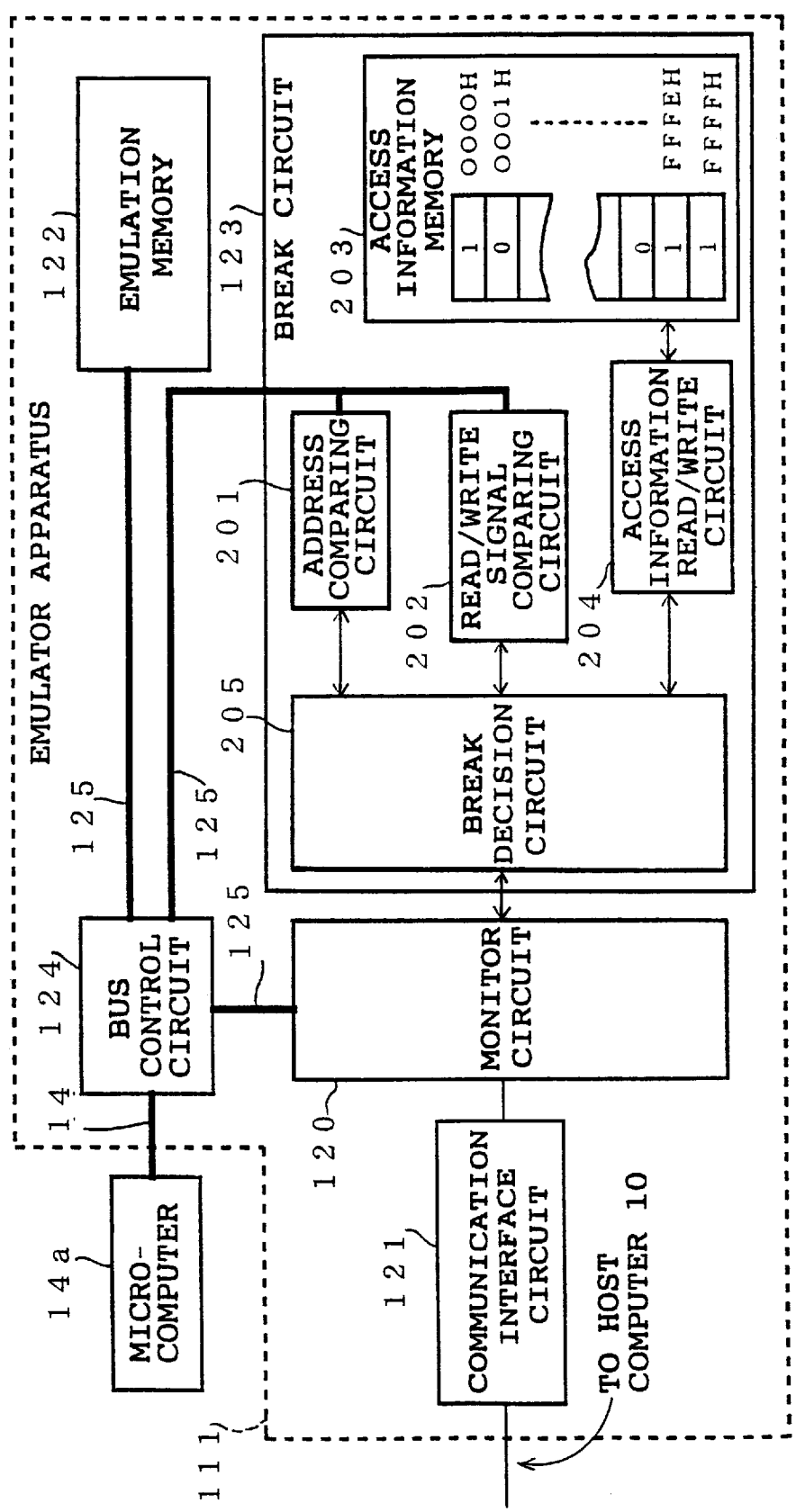
FIG. 1 is a block diagram showing a structure of an emulator apparatus according to the embodiment 1 of the present invention.
Figure 4:
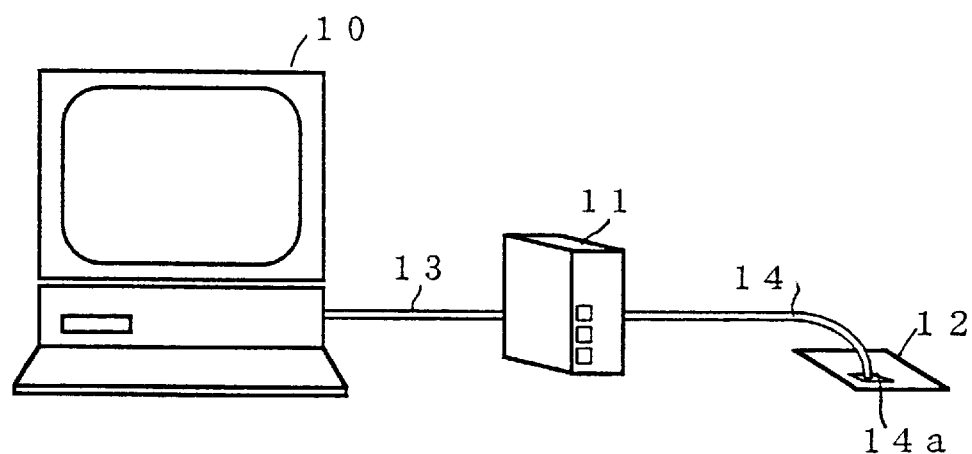
FIG. 4 is a diagram showing an arrangement for a program development system using a conventional emulator apparatus.
Figure 5:
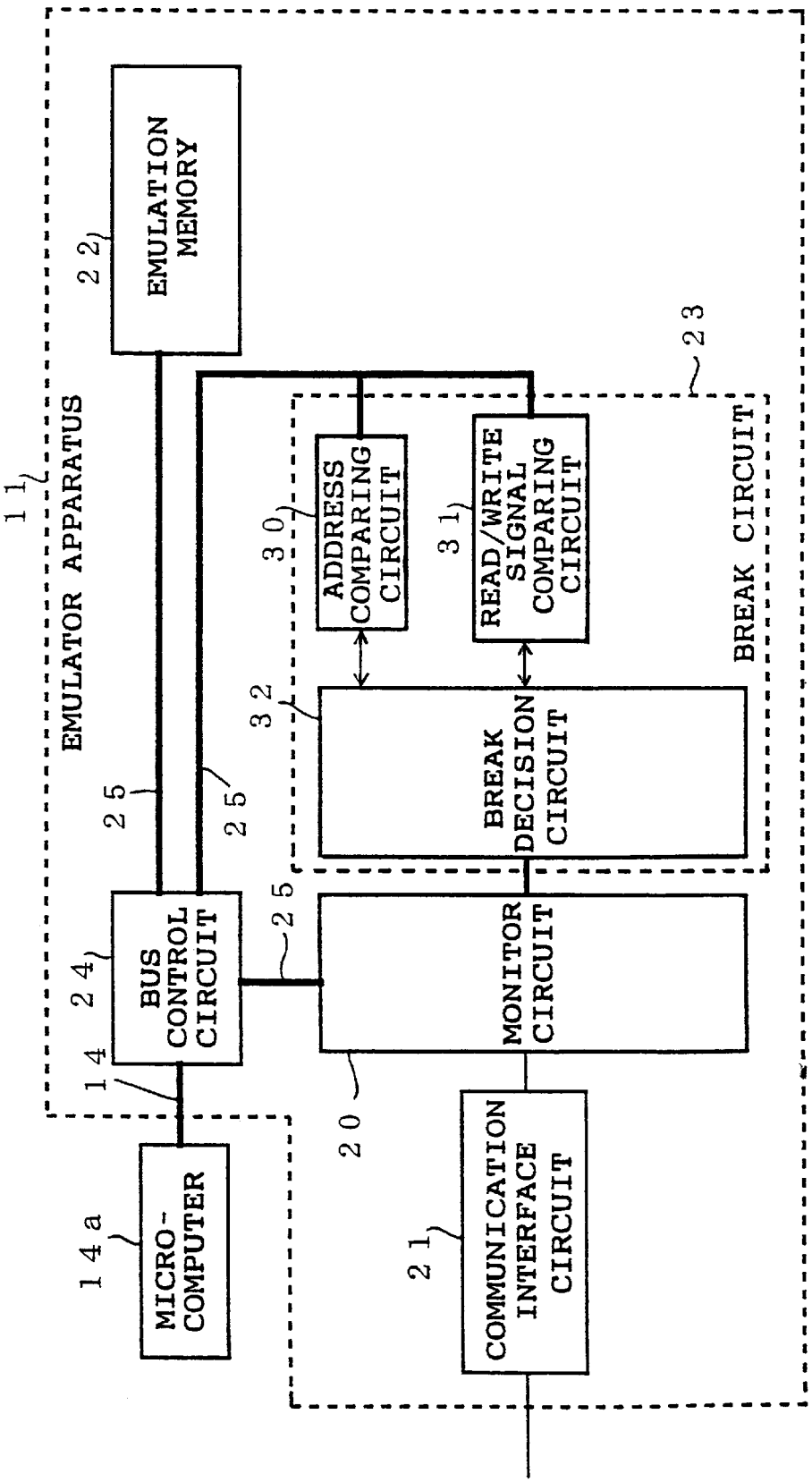
FIG. 5 is a block diagram showing a structure of the conventional emulator apparatus.

FIG. 1 is a block diagram showing a structure of an emulator apparatus according to the embodiment 1 of the present invention. As in a conventional emulator apparatus 11 shown in FIG. 4, an emulator apparatus 111 is connected to a host computer 10, and is connected to a target system 12 through a probe 14 having a microcomputer 14a.

In FIG. 1, reference numeral 120 is a monitor circuit to interpret a command sent from the host computer 10, and execute processing according to the command, 121 is a communication interface circuit for communication interface between the host computer 10 and the monitor circuit 120, 122 is an emulation memory in which program information for emulation transferred from the host computer 10 is stored, 123 is a break circuit to make a decision of break of the program when access meeting a break condition is made, and post it to the monitor circuit 120, and 124 is a bus control circuit to control access of system buses 125.

The break circuit 123 includes an address comparing circuit 201 in which address information of the break condition sent from the monitor circuit 120 is stored, and an address outputted on the system bus 125 is detected to compare whether or not the address matches the break condition, a read/write signal comparing circuit 202 to decide whether access of the emulation program is a read access or a write access by detecting a read/write signal on the system bus 125, an access information memory 203 related to an address of a memory space of the microcomputer 14a, in which 1-bit information is stored, an access information read/write circuit 204 to control writing of data on the access information memory 203, and a break decision circuit 205 to make a decision of break depending upon the results of comparison in the address comparing circuit 201 and the read/write signal comparing circuit 202 and the information stored in the access information memory 203.

An address of the access information memory 203 corresponds to the address of the memory space of the microcomputer 14a in a one-to-one manner. For example, if the microcomputer 14a has a 16-bit address space, 64K bit-information can be written on the access information memory 203 according to addresses OOOOH to FFFFH.

Control of the access information read/write circuit 204 is made to write zero at all the addresses when the program is reset, and write one at a corresponding address of the access information memory 203 when a writing operation is made at a certain address of the memory space of the microcomputer 14a.

First, when the emulation program is transferred to the emulator apparatus 111, or the program is reset by user's intention or the like, zero is stored at all the addresses of the access information memory 203. Subsequently, before the program is executed, a memory area range of a global variable set by a user, that is, information showing in which address range of the memory space of the microcomputer 14a the global variable set by the user is present is transferred from the host computer 10 to the emulator apparatus 111. The transferred information is sent to the monitor circuit 120 through the communication interface 121, and is set in the address comparing circuit 201 by control of the monitor circuit 120.

After the above initialization, the emulation program is executed. The address comparing circuit 201 and the read/write signal comparing circuit 202 monitor the system buses 125 during execution of the program. When the read access or the write access is made to the address range set in the address comparing circuit 201, the information is transferred to the break decision circuit 205. When any data is written on the area range of the global variable, the break decision circuit 205 stores one at a corresponding address of the access information memory 203 through the access information read/write circuit 204. For example, when any data is written at an address OOOFH of the memory space of the microcomputer 14a, the break decision circuit 205 writes one at an address OOOFH of the access information memory 203.

When a data read operation is made to the address range of the global variable in the memory area of the microcomputer 14a, control of the access information read/write circuit 204 is made to read data at a corresponding address of the access information memory 203. If the data is zero, the break decision circuit 205 decides that the global variable is read without being initialized, and sends a break signal to the monitor circuit 120. The monitor circuit 120 receives the break signal to break the currently running program. Further, an address of a breakpoint is transferred to the host computer 10 through the monitor circuit 120 and the communication interface 121. Emulation control software, such as a debugger, runs on the host computer 10, and decides and displays to which global variable the obtained address corresponds.

On the other hand, when the data read operation is made to the address range of the global variable in the memory area of the microcomputer 14a, and data at a corresponding address of the access information memory 203 is one, the break decision circuit 205 decides that the global variable has been initialized, and sends no break signal.

Embodiment 2

Figure 2:
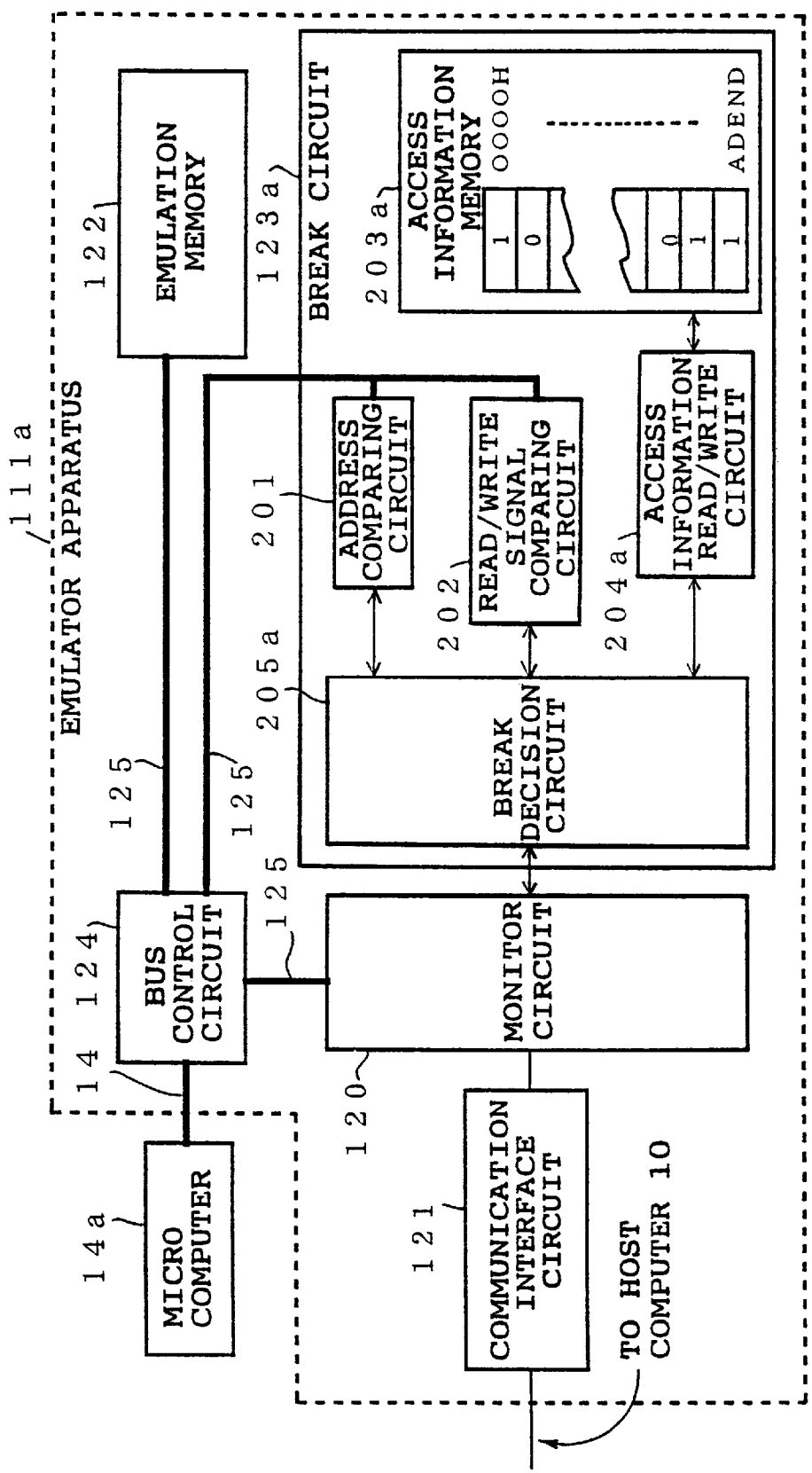
FIG. 2 is a block diagram showing a structure of an emulator apparatus according to the embodiment 2 of the present invention.

FIG. 2 is a block diagram showing a structure of an emulator apparatus according to the embodiment 2 of the present invention. In the drawing, the same reference numerals are used for component parts identical with those in FIG. 1, and descriptions thereof are omitted. In the drawing, reference numeral 123a indicates a break circuit of the embodiment, and 203a is an access information memory which has addresses O to ADEND, and can write 1-bit access information at each address. Reference numeral 204a indicates an access information read/write circuit for control of read or write of access information which is stored in the access information memory 203a, and 205a is a break decision circuit to allocate an address to contain the 1-bit access information for each address range of a global variable, and make a decision of break depending upon the results of comparison in an address comparing circuit 201 and a read/write signal comparing circuit 202, and access information stored in the access information memory 203a.

First, when an emulation program is transferred to an emulator apparatus 111a, or the program is reset by user's intention or the like, the access information read/write circuit 204a stores zero at all the addresses of the access information memory 203a. Subsequently, before the program is executed, global variable information such as the leading address of the global variable and size of data of the global variable, for each global variable set by the user, are transferred from a host computer 10 to a monitor circuit 120 through a communication interface 121. The global variable information is also transferred to the break decision circuit 205a. Further, the global variable information is transferred from the break decision circuit 205a to the address comparing circuit 201. The break decision circuit 205a relates the global variables to the addresses of the access information memory 203a bit by bit depending upon the global variable information. In case of an array variable, a single bit is allocated to each address of the access information memory 203a for each element of an array.

After the above initialization, the emulation program is executed. The address comparing circuit 201 and the read/write signal comparing circuit 202 monitor system buses 125 during execution of the program. When the read access or the write access is made to an address range set in the address comparing circuit 201, the information is transferred to the break decision circuit 205a. When any data is written on an address range of a global variable, the break decision circuit 205a stores one at an address of the access information memory 203a allocated to the address range of the global variable through the access information read/write circuit 204a. For example, when the accessed address is present in an address range of a certain global variable, one is stored at a memory address of the access information memory 203a corresponding to the address range. That is, in the access information memory 203a, the access information is stored not for each address of a memory space of a microcomputer 14a but for each global variable.

When a data read operation is made to an address range of a global variable in a memory area of the microcomputer 14a, control of the access information read/write circuit 204 is made to read data at an address of the access information memory 203a corresponding to the address range of the global variable. If the data is zero, the break decision circuit 205 decides that the global variable is read without being initialized, and sends a break signal to the monitor circuit 120. The monitor circuit 120 receives the break signal to break the currently running program. Further, an address at a breakpoint is transferred to the host computer 10 through the monitor circuit 120 and the communication interface 121. An emulation control software such as debugger runs on the host computer 10, and decides and displays to which global variable the obtained address corresponds.

On the other hand, when the data read operation is made to the address range of the global variable in the memory area of the microcomputer 14a, and data at the corresponding address of the access information memory 203a is one, the break decision circuit 205 decides that the global variable has been initialized, and sends no break signal.

That is, in the embodiment 2, it is decided whether or not the global variable is initialized not by previously allocating a 1-bit memory to all the addresses of the microcomputer 14a but by allocating the single bit for each global variable depending upon the leading address of the global variable and the size of the global variable. As a result, it is possible to reduce a memory capacity of the access information memory 203a.

Embodiment 3

Figure 3:
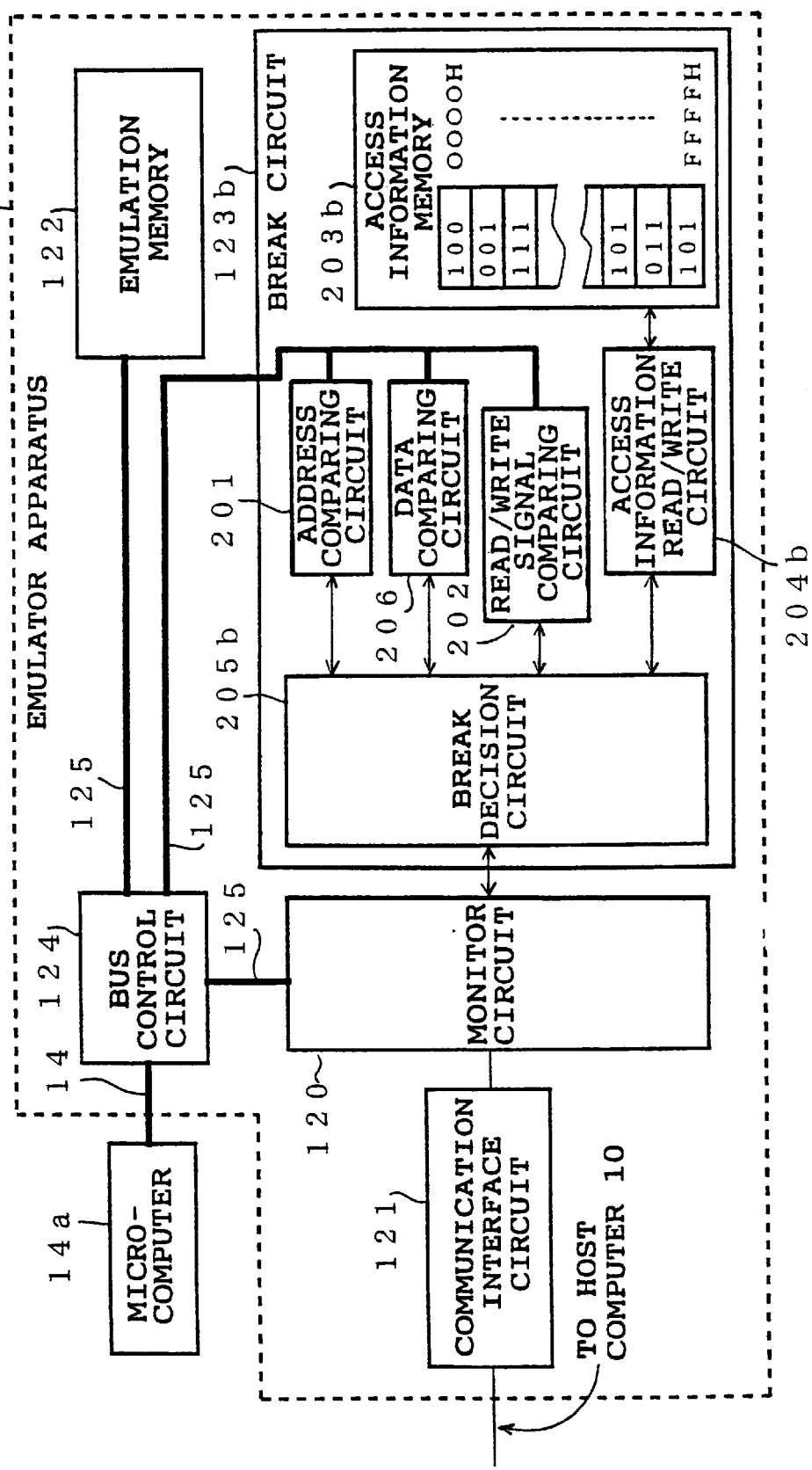
FIG. 3 is a block diagram showing a structure of an emulator apparatus according to the embodiment 3 of the present invention.

FIG. 3 is a block diagram showing a structure of an emulator apparatus according to the embodiment 3 of the present invention. In the drawing, the same reference numerals are used for component parts identical with those in FIG. 1, and descriptions thereof are omitted. In the drawing, reference numeral 123b indicates a break circuit of the embodiment, and 203b is an access information memory which has addresses OOOOH to FFFFH, and can write 1-byte access information at each address. Reference numeral 204b indicates an access information read/write circuit for control of read or write of access information which is stored in the access information memory 203b, 205b is a break decision circuit to make a decision of break depending upon the result of comparison in an address comparing circuit 201 and the result of comparison in a read/write signal comparing circuit 202, and information stored in the access information memory 203b, and 206 is a data comparing circuit to compare whether or not a value of data outputted on a data bus among system buses 125 is zero, and output the result of comparison to the break decision circuit 205b.

A data area may be initialized to zero in an initialization file of a user program, that is, in a routine which the program initially executes, and a global variable may subsequently be set to an optional value other than zero in the program, thereafter setting the program to run. In such a case, after zero is written in the memory, in the emulator apparatus 111 of the embodiment 1, it is impossible to detect whether or not initialization has been made using the optional value in the program. This is because the first initialization has been made by zero once. In such a case, when the program is operated with reference to a variable which is not initialized in the program, unexpected troubles may be caused. Hence, in the embodiment 3, information stored in the access information memory 203b includes 2-bit information about the number of times zero is written in addition to the 1-bit information described in the embodiment 1, showing whether or not a write access is made to each address of a microcomputer 14a.

First, when the program is transferred to an emulator apparatus 111b, or the program is reset by user's intention or the like, zero is stored at all the addresses of the access information memory 203b. Subsequently, before the program is executed, a memory address range of a global variable set by a user, that is, information showing in which address range of a memory space of the microcomputer 14 the global variable set by the user is present is transferred from a host computer 10 to the emulator apparatus 111b. The transferred information is sent to a monitor circuit 120 through a communication interface 121, and is also transferred to the break decision circuit 205b and an address comparing circuit 201 by control of the monitor circuit 120.

After the above initialization, an emulation program is executed. The address comparing circuit 201 and the read/write signal comparing circuit 202 monitor the system buses 125 during execution of the program. When a read access or a write access is made to an address range set in the address comparing circuit 201, the information is transferred to the break decision circuit 205b. When any data is written on the address range of the global variable, the break decision circuit 205b stores one in a first bit at a corresponding address of the access information memory 203a through the access information read/write circuit 204b. For example, when any data is written at an address OOOFH of an address space of the microcomputer 14a, one is written on a first bit at an address OOOFH of the access information memory 203b.

Further, when any data is written on the address range of the global variable, it may be decided that data written by the data comparing circuit 206 is zero. In this case, 2-bit information about the number of times zero is written is written on second and third bits at a corresponding address of the access information memory 203b. That is, when the number of times zero is written is one, zero and one are respectively written on the second and third bits at the corresponding address of the access information memory 203b. On the other hand, when the number of times zero is written is two or more, one and zero are respectively written on the second and third bits. Alternatively, when any data is written on the address range of the global variable, only a value other than zero may be written. In this case, the second and third bits remain zero and zero.

When a data read operation is made to an address range of a global variable in a memory area of the microcomputer 14a, control of the access information read/write circuit 204b is made to read data at a corresponding address of the access information memory 203b. If a first bit of the data is zero, the break decision circuit 205b decides that the global variable is read without being initialized, and sends a break signal to the monitor circuit 120. Alternatively, if a second bit is zero and a third bit is one even when the first bit is one, the break decision circuit 205b decides that a variable without being initialized is referred, and sends the break signal to the monitor circuit. The monitor circuit 120 receives the break signal to break the currently running program. Further, an address at a breakpoint is transferred to the host computer 10 through the monitor circuit 120 and the communication interface 121. Emulation control software, such as, debugger, runs on the host computer 10, and decides and displays to which global variable the obtained address corresponds.

On the other hand, when the data read operation is made to the address range of the global variable in the memory area of the microcomputer 14a, first, second, and third bits of data at a corresponding address of the access information memory 203b may be one, one, and zero, that is, zero may be written twice or more, or the first, second, and third bits may be one, zero, and zero, that is, only a value other than zero may be written. In this case, the break decision circuit 205b decides that the global variable has been initialized, and sends no break signal.

In the embodiment 3, as in the embodiment 1, the access information memory 203b has an address corresponding to the address of the memory space of the microcomputer 14a in a one-to-one manner. However, like the access information memory 203a described in the embodiment 2, information about the number of times write access of zero is made may be stored for each address range of each global variable. Further, in order to facilitate memory management, a 1-byte area, that is, an 8-bit area is reserved as the access information memory 203b for each address. However, it must be noted that a 3-bit area may be reserved for each address.

While preferred embodiments of the invention have been described using specific terms, such description is for illustrative purposes only, and it is to be understood that changes and variations may be made without departing from the spirit or scope of the following claims.

What is claimed is:

1. An emulator apparatus operating a microcomputer by an emulation program, the emulator apparatus comprising:

read/write access deciding means connected to system buses of the microcomputer for determining whether the emulation program performs a read access or a write access to a memory address of the microcomputer while the emulation program is executing;

access information storing means for, when the read/write access deciding means determines that the emulation program performs a write access to a memory address of the microcomputer while the emulation program is executing, correlating information indicating the presence of the write access with the write-accessed memory address of the microcomputer and storing the information; and break means for breaking execution of the emulation program when the read/write access deciding means determines that the emulation program performs a read access to a memory address of the microcomputer, and the access information storing means does not contain information indicating the presence of a write access to the read-accessed memory address of the microcomputer.

2. The emulator apparatus according to claim 1, comprising address deciding means for deciding whether a read access or a write access is performed to an address in an address range of a global variable specified by the emulation program during execution of the emulation program, wherein, when the address deciding means determines that a write access is performed to an address in the address range of a global variable, the access information storing means correlates information indicating the presence of the write access with the address of the global variable being written to and stores the information.

3. The emulator apparatus according to claim 1, wherein the access information storing means includes an access information memory having addresses corresponding to memory addresses of the microcomputer in a one-to-one manner, and when the emulation program performs a write access to a memory address of the microcomputer, information indicating the presence of the write access is stored at an address of the access information memory corresponding to the write-accessed memory address of the microcomputer.

4. The emulator apparatus according to claim 2, wherein the access information storing means includes an access information memory having addresses corresponding to memory addresses of the microcomputer in a one-to-one manner, and when the emulation program performs a write access to a memory address of the microcomputer, information indicating the presence of the write access is stored at an address of the access information memory corresponding to the write-accessed memory address of the microcomputer.

5. The emulator apparatus according to claim 1, wherein information indicating the presence of a write access is stored in the access information storing means for each address range occupied by each global variable specified by the emulation program.

6. The emulator apparatus according to claim 2, wherein information indicating the presence of a write access is stored in the access information storing means for each address range occupied by each global variable specified by the emulation program.

7. The emulator apparatus according to claim 1, comprising data deciding means connected to the system buses of the microcomputer, for determining whether a value of data outputted from the microcomputer to the system buses during execution of the emulation program is zero, wherein, when the read/write access deciding means determines that the emulation program performs a write access to a memory address of the microcomputer, and the data deciding means determines that a value of data written during the write access is zero, information indicating the number of times data having a value of zero is written to the write-accessed memory address of the microcomputer is correlated with the write-accessed address and stored in the access information storing means, and the break means breaks operation of the emulation program when the read/write access deciding means determines that the emulation program performs a read access to the memory address of the microcomputer, and the information stored in the access information storing means indicates that data having a value of zero is stored at the read-accessed memory address of the microcomputer only once.

8. The emulator apparatus according to claim 2, comprising data deciding means connected to the system buses of the microcomputer, for determining whether a value of data outputted from the microcomputer to the system buses during execution of the emulation program is zero, wherein, when the read/write access deciding means determines that the emulation program performs a write access to a memory address of the microcomputer, and the data deciding means determines that a value of data written during the write access is zero, information indicating the number of times data having a value of zero is written to the write-accessed memory address of the microcomputer is correlated with the write-accessed address and stored in the access information storing means, and the break means breaks operation of the emulation program when the read/write access deciding means determines that the emulation program performs a read access to the memory address of the microcomputer, and the information stored in the access information storing means indicates that data having a value of zero is stored at the read-accessed memory address of the microcomputer only once.

9. The emulator apparatus according to claim 3, comprising data deciding means connected to the system buses of the microcomputer, for determining whether a value of data outputted from the microcomputer to the system buses during execution of the emulation program is zero, wherein, when the read/write access deciding means determines that the emulation program performs a write access to a memory address of the microcomputer, and the data deciding means determines that a value of data written during the write access is zero, information indicating the number of times data having a value of zero is written to the write-accessed memory address of the microcomputer is correlated with the write-accessed address and stored in the access information storing means, and the break means breaks operation of the emulation program when the read/write access deciding means determines that the emulation program performs a read access to the memory address of the microcomputer, and the information stored in the access information storing means indicates that data having a value of zero is stored at the read-accessed memory address of the microcomputer only once.

10. The emulator apparatus according to claim 4, comprising data deciding means connected to the system buses of the microcomputer, for determining whether a value of data outputted from the microcomputer to the system buses during execution of the emulation program is zero, wherein, when the read/write access deciding means determines that the emulation program performs a write access to a memory address of the microcomputer, and the data deciding means determines that a value of data written during the write access is zero, information indicating the number of times data having a value of zero is written to the write-accessed memory address of the microcomputer is correlated with the write-accessed address and stored in the access information storing means, and the break means breaks operation of the emulation program when the read/write access deciding means determines that the emulation program performs a read access to the memory address of the microcomputer, and the information stored in the access information storing means indicates that data having a value of zero is stored at the read-accessed memory address of the microcomputer only once.

11. The emulator apparatus according to claim 5, comprising data deciding means connected to the system buses of the microcomputer, for determining whether a value of data outputted from the microcomputer to the system buses during execution of the emulation program is zero, wherein, when the read/write access deciding means determines that the emulation program performs a write access to a memory address of the microcomputer, and the data deciding means determines that a value of data written during the write access is zero, information indicating the number of times data having a value of zero is written to the write-accessed memory address of the microcomputer is correlated with the write-accessed address and stored in the access information storing means, and the break means breaks operation of the emulation program when the read/write access deciding means determines that the emulation program performs a read access to the memory address of the microcomputer, and the information stored in the access information storing means indicates that data having a value of zero is stored at the read-accessed memory address of the microcomputer only once.

12. The emulator apparatus according to claim 6, comprising data deciding means connected to the system buses of the microcomputer, for determining whether a value of data outputted from the microcomputer to the system buses during execution of the emulation program is zero, wherein, when the read/write access deciding means determines that the emulation program performs a write access to a memory address of the microcomputer, and the data deciding means determines that a value of data written during the write access is zero, information indicating the number of times data having a value of zero is written to the write-accessed memory address of the microcomputer is correlated with the write-accessed address and stored in the access information storing means, and the break means breaks operation of the emulation program when the read/write access deciding means determines that the emulation program performs a read access to the memory address of the microcomputer, and the information stored in the access information storing means indicates that data having a value of zero is stored at the read-accessed memory address of the microcomputer only once.

13. The emulator apparatus as claimed in claim 1 wherein the access information storing means stores the information indicating the presence of the write access at an address in the access information storing means corresponding to the write-accessed memory address of the microcomputer.

* * * * *